A. BEAN.
Cane-Stripper.
No. 61,385.                                             Patented Jan. 22, 1867.
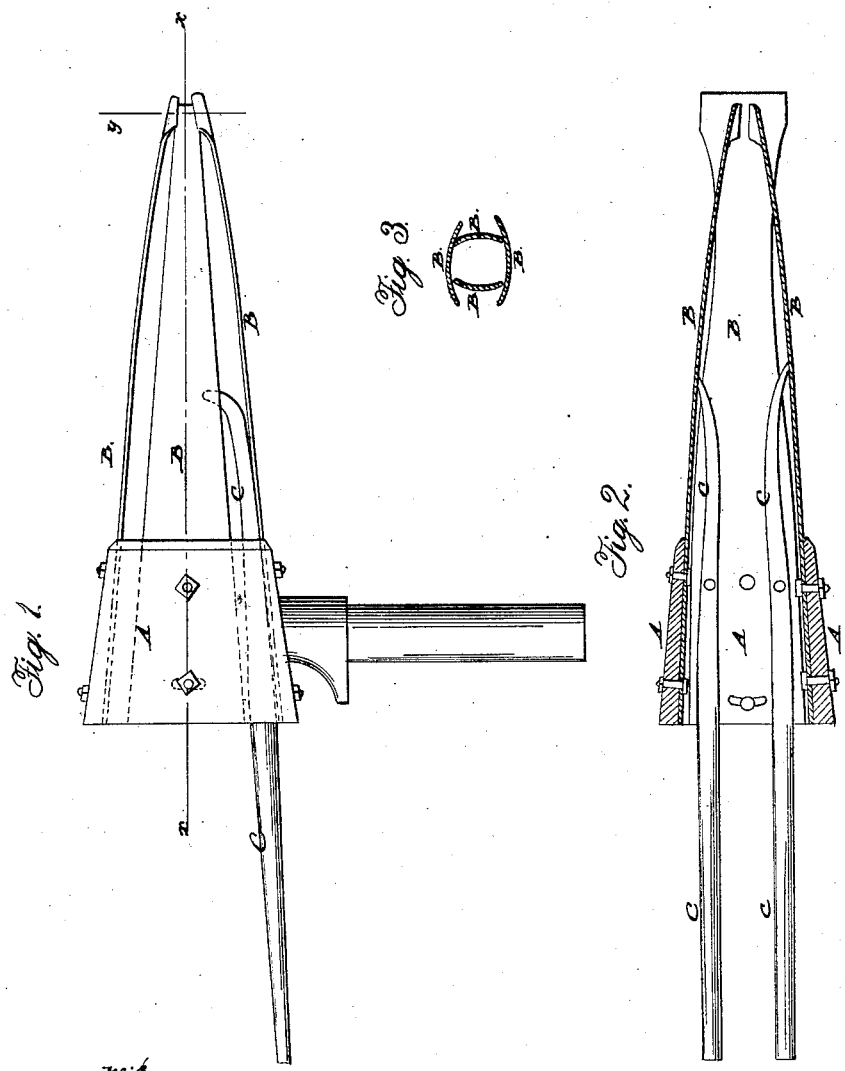

United States Patent Office.

AMOS BEAN, OF CANAANVILLE, OHIO.

Letters Patent No. 61,385, dated January 22, 1867.

---

IMPROVEMENT IN SORGHUM-STRIPPER.

---

*The Schedule referred to in these Letters Patent and making part of the same.*

---

TO ALL WHOM IT MAY CONCERN:

Be it known that I, AMOS BEAN, of Canaanville, in the county of Athens, and State of Ohio, have invented a new and useful Improvement in Cane-Stripper; and I do hereby declare that the following is a full, clear, and exact description thereof, which will enable others skilled in the art to make and use the same, reference being had to the accompanying drawings, forming part of this specification, in which—

Figure 1 is a side view of my improved cane-stripper.

Figure 2 is a horizontal section of the same taken through the line $x\ x$, fig. 1.

Figure 3 is a vertical section of the same taken through the line $y\ y$, fig. 1.

Similar letters of reference indicate like parts.

My invention has for its object to furnish an improved instrument by means of which cane may be stripped quickly and cleanly.

And it consists of an improved cane-stripper formed by the combination of the adjustable spring-knives with the cast-iron box or frame to which they are attached, and in the combination of the pivoted levers with the spring-knives and iron box; the whole being constructed and arranged as hereinafter more fully described.

A is the box or body of the machine, which is cast in one piece, substantially in the form shown in the drawings; that is to say, it is about three by four inches, interior measurement, at its rear end, and gradually tapers towards the front end, as shown, and is about three and a half inches in length. $a'$ is a pin cast upon its lower side, by means of which it is pivoted to a post, block, or other suitable support. B are the spring-knives, the forward ends of which are curved, as shown in the drawings, so as to clasp the cane and adjust themselves to it, whatever may be its size. This curved form of the ends of the spring-knives also enables the side knives to be used to force the upper and lower knives apart for the more convenient introduction of the cane. The rear ends of the spring-knives should be secured to the inner sides of the cast-iron box or frame A by bolts and nuts, the rear bolts of each knife passing through slots in said knives, as shown in the drawings, so that the said knives may be adjusted as required. C are levers pivoted to the inner surface of the lower part of the box or body A, as shown in fig. 2, and the forward ends of which curve upward, as shown in fig. 1, so as to rest against the inner sides of the side knives B, as shown. By pressing the rear ends or handles of the levers C towards each other, their forward ends are forced apart, forcing the side knives apart, the curved forward ends of which acting upon the curved forward ends of the upper and lower knives, force them apart, and so enlarge the opening between the ends of the knives that the cane can be easily introduced.

In using the machine, a post is set in the ground, or some other suitable support is provided, in the upper end or side of which is formed a hole for the reception of the pin $a'$. This hole should be sufficiently large to allow the said pin to turn freely therein, so that the machine may change its position in stripping crooked stalks to adapt itself to the varying direction of said stalks, and to strip without cutting or breaking them. A table of suitable size and height should be placed in front of the machine to receive the unstripped cane, which is placed thereon with its small or top ends toward the machine. The points or forward ends of the knives B are opened by operating the levers C with the right hand; the stalks are fed in with the left hand, and drawn through with the right hand, coming out stripped clean from all extraneous covering.

What I claim as new, and desire to secure by Letters Patent, is—

1. An improved cane-stripper formed by the combination of the adjustable spring-knives B, and cast-iron box or frame A, said parts being constructed and arranged substantially as herein shown and described.

2. The combination of the levers C with the spring-knives B and box or frame A, substantially as herein shown and described, and for the purpose set forth.

AMOS BEAN.

Witnesses:
W. D. BARTLETT,
N. H. VAN VORHES.